United States Patent [19]

Mika et al.

[11] 3,961,375
[45] June 1, 1976

[54] APPARATUS FOR CLEANING AN INFORMATIONAL TAPE

[75] Inventors: Paul L. Mika, Des Plaines; Kurt Rothlisberger, Morton Grove; Richard F. Vee, Chicago, all of Ill.

[73] Assignee: Teletype Corporation, Skokie, Ill.

[22] Filed: July 15, 1974

[21] Appl. No.: 488,623

[52] U.S. Cl. .............................. 360/137; 242/198; 15/256.5; 360/128
[51] Int. Cl.² .......................................... G11B 5/00
[58] Field of Search ........................ 15/256.5, 256.6; 360/128, 137, 134

[56] References Cited
UNITED STATES PATENTS

| | | | |
|---|---|---|---|
| 3,091,794 | 6/1963 | Pillsbury | 360/128 X |
| 3,434,273 | 3/1969 | Lovell | 15/256.5 |
| 3,624,858 | 12/1971 | Dimond et al. | 15/256.5 |

*Primary Examiner*—Richard E. Aegerter
*Assistant Examiner*—L. Footland
*Attorney, Agent, or Firm*—W. K. Serp; J. L. Landis

[57] ABSTRACT

An apparatus and method for cleaning an informational tape carried in a tape cassette. The cassette is positioned within a cradle defining a rear wall. Mounted to the wall for rotary movement thereon is a bobbin wrapped with cleaning fabric. Coaxially secured to the bobbin is a ratchet wheel and positioned for actuation of the ratchet wheel is a drive pawl. The drive pawl is carried by a pawl arm mounted for substantially linear movement in response to the placement of a tape cassette within the cradle. Positioning of the cassette within the cradle imparts linear motion to the pawl arm causing the bobbin to incrementally rotate exposing a clean segment of the cleaning fabric to the informational tape.

13 Claims, 6 Drawing Figures

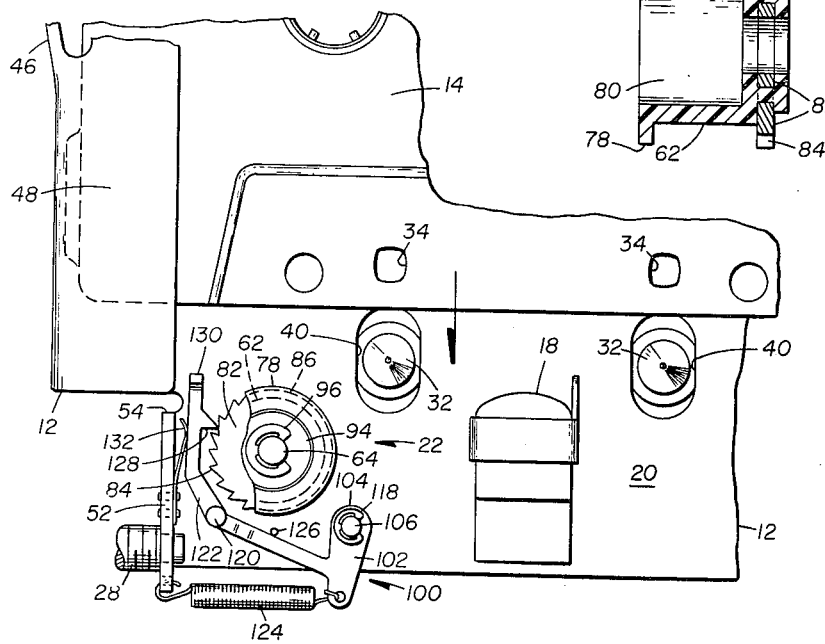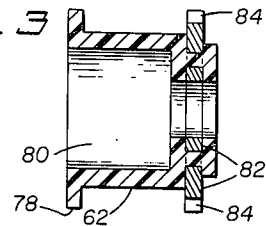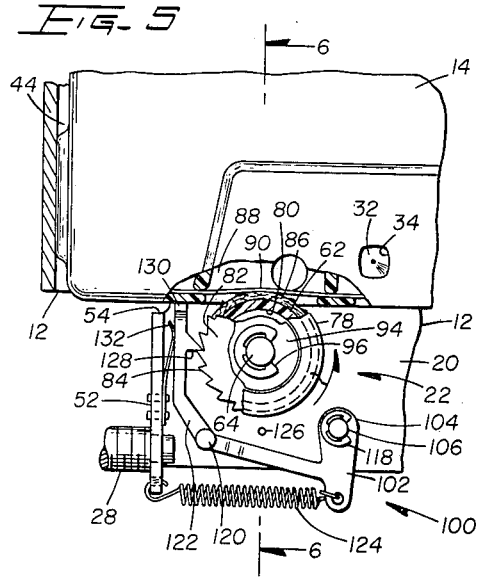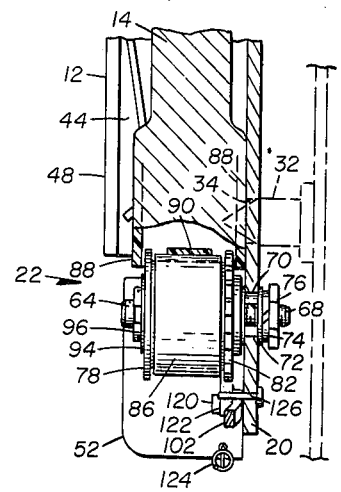

APPARATUS FOR CLEANING AN INFORMATIONAL TAPE

BACKGROUND OF THE INVENTION

This invention relates to an apparatus for cleaning an informational tape carried in a tape cassette and more particularly relates to an apparatus for presenting a fresh cleaning media to the informational tape in response to each placement of the cassette in a recorder.

Various media have been suggested and used for recording digital information. A particular medium finding increased usage is a tape cassette. Digital cassettes are similar in construction to audio cassettes which have enjoyed increasing commercial acceptance over the past ten years. The construction and operational features of such digital cassettes are akin to the audio types with the additional consideration that much higher mechanical and electrical standards are maintained. The information density upon a digital tape is relatively high as is the speed at which the tape is drawn across the record-playback (R/P) head thus necessitating the maintenance of close physical tolerances between the tape and the R/P head at the record-playback station of the cassette. A particular problem which occurs with the use of most tape cassettes and particularly digital tape cassettes, wherein the informational density is particularly high and wherein the tape speed is relatively fast, is the accumulation of dust and dirt upon the tape. Such tape contamination increases tape wear and frequently generates noise resulting in erroneous playback and record signals.

To reduce such tape contamination, various devices have been suggested for cleaning the tape. U.S. Pat. No. 3,701,178 entitled "Cassette Tape Cleaner" issued to J. C. Kuntz on Oct. 31, 1972, utilizes blades mounted in the recorder to scrape the tape and an air stream removes the scrappings from the blades. This procedure introduces considerable tape wear as the blades are drawn across the tape. Further, the mechanism used to generate the necessary air stream significantly increases the cost of the recorder. Still another approach suggests the use of a fiberous cleaning material or pad which is brought into contact with the tape wiping the surface thereof. It will be appreciated that over prolonged periods of use, the surface of the pad will become impregnated with bits and particles of dirt and other abrasive substances. In this condition, the pad acts as an abrasive which cuts and scores the tape as it is drawn thereacross. Thus, when the cleaning pad becomes excessively ladened with particles, the cleaning material must be replaced. Maintenance of the pad places a viligant burden upon the operator since the pad must be continuously checked and the cleaning material replaced before it becomes contaminated to the point where tape damage results. Such continuous attention by the operator is difficult to attain in practice and frequently the cleaning material becomes contaminated and remains so for prolonged periods of time.

The illustrated embodiment provides a unique and improved means for cleaning a cassette tape which greatly reduces the possibility of wear to the tape by abrasive materials trapped in the cleaning media.

SUMMARY

Described is an apparatus for wiping particles from the surface of a moving magnetic tape carried in a cassette. Included is a wiping media which defines a plurality of continuous discrete wiping segments and means for positioning a segment of the wiping media into wiping relation with the tape. Additionally, means are included responsive to the positional movement of the cassette for advancing a successive segment of the wiping media into wiping relation with the tape so as to prevent a non conaminated wiping segment to the tape.

The wiping media is wrapped about the outwardly disposed surface of a bobbin and positioned for surface contact with the tape carried within the cassette. Means are included for incrementally rotating the bobbin so that a successive segment of the wiping media is presented to the tape.

BRIEF DESCRIPTION OF THE DRAWINGS

FIG. 3 is a full sectional view of a subcomponent of the component illustrated in FIG. 2;

FIG. 4 is an enlarged fragmentary frontal view of a component of the recorder illustrated in FIG. 1 including a tape cassette positioned in a location just prior to engagement with the tape cleaning apparatus;

FIG. 5 is an enlarged fragmentary frontal view of a component of the recorder illustrated in FIG. 1 including a tape cassette fully positioned within the recorder and a full engagement with the tape cleaning apparatus; and FIG. 6 is a full sectional view taken along the line 6—6 of FIG. 5.

DESCRIPTION OF THE ILLUSTRATED EMBODIMENT

General

Figure 1:
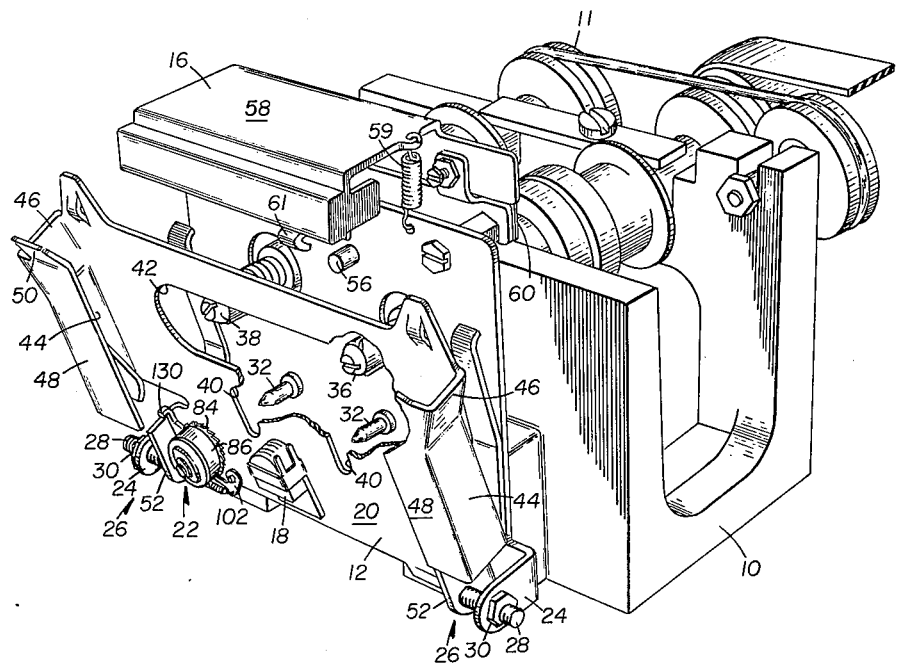
FIG. 1 is a full perspective view of a cassette recorder having a tape cleaning apparatus including certain features of this invention with a portion of the recorder broken away for clarity of illustration.

With particular reference to FIG. 1, the illustrated recorder includes a support assembly 10 carrying a tape drive mechanism 11 and a cradle 12 pivotally mounted thereon. The cradle 12 defines a cavity shaped to receive a conventional tape cassette 14. Mounted to the support assembly 10 and biased for engagement with the upwardly disposed edge of the cassette 14 is a cassette latching mechanism 16. A record-playback head 18 is secured to the lower end of a rear wall 20 of the cradle 12 and positioned so that the upwardly disposed surface of the record-playback head 18 accurately engages the informational tape carried by a cassette placed in the cradle 12 as will hereinafter be further described. Additionally, supported on the cradle 12 and positioned for engagement with the tape of a tape cassette is a tape cleaning apparatus 22 which serves to remove dirt and particles from the tape as the tape is drawn between the reels of the cassette across the playback head 18. The features of the cleaning apparatus 22 will be considered in greater detail hereinafter. For a more detailed description of the support assembly 10 drive mechanism 11, cradle 12 and latch mechanism 16, the reader's attention is directed to U.S. patent application by K. Rothlisberger-R. F. Vee entitled "Apparatus and Mechanism for Positioning A Tape Cassette", Ser. No. 479,395, filed June 14, 1974, having a common assignee herewith and incorporated herein by reference.

Cradle

As mentioned, the cradle 12 is pivotally mounted to the forward surface of the support assembly 10. Serving to provide relative arcuate pivotal movement between the cradle 12 and support assembly 10, the lower end of the assembly defines a pair of outwardly projecting brackets 24 which form a portion of a cradle support hinge 26. The outwardly disposed ends of each of the brackets 24 are drilled to receive coaxial threaded cradle support hinge pins 28. The ends of the hinge pins 28 are opposingly positioned to engage mating openings formed in the cradle 12 as will subsequently be described. Serving to prevent vibrational movement of the hinge pins 28 are lock nuts 30 which are threaded about the pins 28 and tightened against the outwardly disposed surfaces of the cradle support brackets 24. Guiding and positioning a cassette within the cradle 12 are a pair of spatially positioned forwardly projecting guide members in the form of cassette guide pins 32 which are secured to a forwardly disposed surface of the cradle support assembly and project towards the cradle. The ends of the pins are conically shaped so as to engage a pair of alignment openings 34 of the tape cassette 14 thereby camming the cassette 14 into relative position with respect to the playback-record head 18. The pins 32 are located with reference to a predetermined record-playback head 18 location as determined by industry manufacturing standards respecting the dimensional parameters of a conventional tape cassette as further described in the cited reference.

As mentioned, the cradle 12 defines a cassette receiving cavity and includes the rear planar wall 20 the surface of which is oriented substantially normal to the axes of a drive 36 and a take-up 38 spindle when the cradle 12 is positioned adjacent the support assembly 10. The rear wall 20 defines a pair of elongated spaced guide pin apertures 40 which are positioned to allow the guide pins 32 projecting from the surface of the surface assembly 10 to pass therethrough. A third elongated spindle opening 42 is defined by the rear wall 20 of the cradle 12. The major axis of this opening is normal to the major axis of the guide pin apertures 40 and positioned to allow the take-up 38 and a drive 36 spindles to pass freely therethrough and into the cradle cavity as the cradle 12 is pivoted about the hinge 26. Additionally, the cradle 12 includes a pair of opposing side walls 44 having a shape conforming to that of a conventional tape cassette. The upwardly disposed ends of the side walls 44 are flared outwardly as at 46 so that the opposing faces thereof define camming surfaces for guiding a cassette into the cavity defined by the cradle 12. A pair of partial, opposing front walls 48 extend respectively from the ends of the side walls 44 and lie in a plane parallel to the rear wall 20 of the cradle 12. The upwardly disposed ends of the front walls 48 define guide tabe 50 which are also flared outwardly providing a pair of camming surfaces disposed towards the rear wall 20 of the cradle 12 which serve to cam a cassette, upon placement into the cavity 12, toward the rear wall 20 thereof.

Serving to mount the cradle 12 for pivotal movement with respect to the support assembly 10, the cradle 12 is formed with a pair of forwardly disposed cradle hinge brackets 52 extending from the rear wall 20 of the cradle 12 and inwardly offset and having a plane substantially parallel to the plane of the side wall 44 of the cradle 12. Each of the brackets define a circular hole adapted to receive the ends of respective hinge pin 28 thereby pivotally mounting the cradle 12 to the support assembly 10. As illustrated in FIG. 1, the hinge pins 28 are seated in mating openings defined by the brackets 52 and the cradle 12 is centered with respect to the guide pins 32 and spindles 36 and 38. The guide pins 32 and the drive 38 and take-up 36 spindles are in registration with their respective openings so that they will freely pass through the wall 20 as the cradle 12 is swung about the hinge assembly 26. Each of the upwardly disposed edges of the hinge brackets 52 define cradle support surfaces 54 which serve to limit downward cassette movement and roughly position a cassette within the cradle 12 cavity prior to more precise positioning by the guide pins 32. Serving to limit pivotal movement of the cradle 12 with respect to the support assembly 10 is a cradle stop pin 56 which extends from the support assembly 10 toward the cradle 12. The length of the pin 56 is selected with respect to the location of the pivot axis of the hinge so that the plane of the rear wall 20 of the cradle 12 is normal to the axis of the spindles 36, 38 when the wall 20 abuts the pin 56.

Securely holding a cassette positioned in the cradle in the operating position is the latching mechanism 16 supported on the support assembly 10 adjacent the upper end of the cradle 12. The latching mechanism 16 includes a U-shaped housing 58 resiliently supported on the support assembly 10 with the bite of the housing 58 downwardly disposed towards the upper end of the cradle 12. The rearwardly disposed leg of the housing 58 is secured to the upwardly disposed end of a flat cantilevered spring 60 which is secured to the support assembly 10. A latch 61, carried by the housing 58, engages the upper edge of a cassette seated in the cavity of the cradle 12 and serves to retain the cradle and cassette in an operating position with the cradle wall 20 adjacent the support assembly 10. A coil spring 59 is secured to the center of the bite of the housing 58 and to the support assembly 10 biasing the latch 61 against the top of a cassette carried within the cradle 12.

Tape Cleaning Assembly

Figure 2:
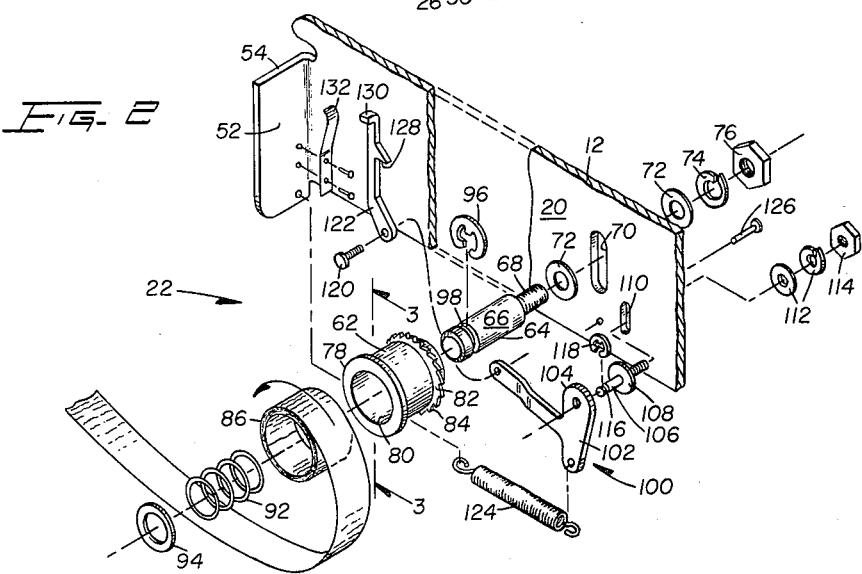
FIG. 2 is an exploded view of a component of the apparatus illustrated in FIG. 1.

As particularly illustrated in FIG. 2, the tape cleaning apparatus is mounted to the rear wall 20 of the cradle 12 adjacent the cradle support bracket 52 and includes a bobbin 62 pivotally supported to the rear wall 20 of the cradle 12 by means of a bobbin support spindle 64. The spindle 64 includes an elongated oversized center portion 66 and a threaded end 68 which is positioned through an elongated adjusting slot 70 defined by the rear cradle wall 20 and secured in place by means of a pair of flat washers 72, a lock washer 74 and mating nut 76. As particularly illustrated in FIG. 3 the bobbin 62 is cup-shaped and defines an outwardly extending flange 78 and an opening 80 which is shaped to freely pass the bobbin support spindle 64 therethrough. Molded integral with the sleeve and extending outwardly therefrom is a toothed bobbin ratchet wheel 82 defining a plurality of raked teeth 84. As illustrated in FIG. 2, the outwardly disposed surface of the bobbin is wound with multiple layers of a fibrous tape cleaning fabric 86 and the end thereof retained in place with suitable adhesive. Although various types of suitable tape cleaning fabric may be used, a particular fabric which has been found to be suitable is manufactured by the Minnesota Mining and Manufacturing Company designated Scotch, Number 610 tape cleaning fabric. As illustrated in FIG. 6, the bobbin width is slightly less than the inner space defined by the facing surfaces of the walls 88 of the cassette 14 so that the bobbin 62 will fit inside the cassette with the fabric 86 in contact with a tape 90 carried within the cassette 14. During assembly, a bobbin position, retaining coil spring 92 is coaxially placed over the support spindle and into the bobbin 62 cavity. Positioned against the outwardly directed end of the coil spring 92 is a retaining washer 94, the diameter of which is such that the washer 94 fits inside the bobbin cavity 80. The spring is held in place by means of a Truarc clip 96 snapped into engagement with a circumferential groove 98 defined by the outer circumference of the support spindle 64. Thus, it will be appreciated that the coil spring 92 is compressed between the bobbin 62 and the washer 94 forcing the bobbin 62 against the washer 72 thus restricting rotation of the bobbin as will subsequently be further described.

Serving to impart rotation to the bobbin 62 is a drive pawl assembly 100 which includes a T-shaped pawl link 102. One of the short legs 104 of the link defines a pivot arm 102 through which is passed a pawl linkage pivot pin 106. Formed with the pin 106 is a circular flange 108. A threaded end of the pin 106 is passed through an elongated slot 110 defined by the wall 20 of the cradle 12 until the flange rests on the wall of the cradle. The pin 106 is positioned and secured in place by means of washers 112 and a nut 114 tightened against the cradle wall 20. The outwardly directed end of the pin 106 defines a circular groove 116 which receives a Truarc clip 118 snapped onto the pin, thus pivotally retaining the arm 104 to the pin 106. The major leg of the pawl link 102 defines a circular opening through which is passed a connecting pin 120 which serves to pivotally secure the link 102 to a pawl arm 122. A first leg of the link 102 is hooked to a pawl linkage spring 124, the remaining end of which is secured to a suitable opening in the hinge bracket 52 of the cradle 12. The pawl linkage spring 124 rotatably biases the pawl assembly in a clockwise direction as viewed in FIG. 1 towards the bobbin 62. This rotary clockwise movement is limited by a stop pin 126 which, in the illustrated embodiment, is an elongated split sleeve force-fit into a hole defined by the rear wall 20 of the cradle 12. The pawl arm 122 carries a drive pawl 128 which is positioned for mating engagement with the ratchet wheel 82 carried by the bobbin 62. Serving to downwardly deflect the pawl arm 122 and thus rotatably drive the bobbin 62 is a pawl drive tab 130. A downward force applied to the pawl drive tab 130 causes the drive pawl 128 to engage the ratchet wheel 82 incrementally rotating the ratchet wheel 82 and the bobbin 62 carried thereon. The drive pawl 128 is maintained in contact with the ratchet wheel 82 by means of a pawl arm leaf spring 132 which is secured to the hinge bracket 52 biasing the pawl arm 122 towards the ratchet wheel 82.

Operation

The operation of the tape cleaning apparatus 22 may be more readily appreciated with particular reference to FIGS. 4, 5 and 6 wherein the cradle 12 is illustrated in cooperation with the positioning of a conventional tape cassette into the cradle 12. With respect to FIG. 4, the cassette 14 is illustrated partially inserted into the cradle 12 before reaching its fully inserted position with the bottom edge of the cassette 14 resting upon the upwardly disposed ends of the cradle hinge brackets 52. The cassette is inserted into the cradle 12 when the cradle is in its loading position as illustrated in FIG. 1 with both the spindles 36 and 38 and the cassette guide pins 32 being spaced from the interior cavity of the cradle 12. In this position, the drive pawl assembly 100 is rotated to a maximum clockwise position under bias of the pawl linkage spring 124 until rotational movement is limited by means of the stop pin 126. In this position, the pawl arm 122 is in its uppermost position and against the ratchet wheel 82 under bias of the leaf spring 132 with the drive pawl 128 resting in the fall of the ratchet teeth 84. As the cassette is forced downward to the fully seated position of FIG. 5, the lower end of the cassette 14 engages the pawl drive tab 130 forcing the pawl arm 122 downwardly and the drive pawl assembly 100 counterclockwise about the pin 102 against the bias of the pawl linkage spring 124. The drive pawl 128 engages the teeth 84 of the ratchet wheel 82 causing the bobbin 62 to rotate incrementally in a counter clockwise direction about the bobbin support spindle 66 as illustrated by the arrow in FIG. 5. In this position, the bobbin 62 is fitted between the inner walls 88 of the cassette 14 and the cleaning fabric 86 wound about the tape bobbin 62 is in engagement with the magnetic tape 90 carried in the cassette. Thus, as the tape 90 is transported through the cassette 14 across the playback-record head 18, the tape 90 is drawn across the fabric 86 wound on the bobbin 62 and thus lint and particles are removed.

It will be appreciated that each time the cassette 14 is removed from the cradle 12, the pawl arm 122 will move upwardly under bias of the spring 124 to the position of FIG. 4. However, the bobbin 62 will remain in position due to the frictional force between the bobbin 62 and the rear wall of the cradle 12 created by the breaking spring 92 forcing the bobbin 62 against the washer 72. This breaking force prevents clockwise rotational movement of the bobbin 62 during the return stroke of the pawl arm 122 to the position of FIG. 4. It will be appreciated that each time a cassette is placed in the cradle 12, the bobbin 62 is caused to incrementally rotate, positioning a clean segment of the cleaning fabric 86 carried on the bobbin 62 against the tape. In this manner the cassette tape 90 is prevented from being wiped with a contaminated portion of the cleaning fabric 86; rather, a clean portion is continuously moved into position. After the bobbin 62 has made a complete revolution, the outer convolution of the cleaning fabric 86 may be removed displaying a clean layer of cleaning fabric 86. Once the cassette 14 is fully seated in the cradle, the cradle is pivoted until the cassette locking mechanism engages the upper edge of the cradle holding it in operating position. The cradle is accurately cammed into position with respect to the cleaning bobbin and the playback head by means of the guide pins which pass through the alignment openings of the cassette as illustrated in phantom in FIG. 6.

While this invention is particularly shown and described in connection with an illustrated embodiment, it will be appreciated that various changes in form and detail may be made without departing from the spirit and scope of the invention as set forth in the following claims.

What is claimed:

1. In combination with a cassette recorder having a cradle defining a cavity for receipt of a cassette containing a magnetic tape, wherein the cradle has an inner wall disposed toward and serving to define at least a portion of the cavity, and wherein the cassette is selectively movable from a first position to a second position, an apparatus for wiping particles from the surface of the moving magnetic tape comprising:
- a rotatable bobbin mounted upon said inner wall of said cradle;
- a wiping media wrapped about an outwardly disposed surface of said bobbin, said bobbin being positioned on said inner wall of said cradle for selective surface contact of the wiping media with the magnetic tape carried in the cassette; and
- means, actuated by movement of the cassette from the first to the second position for incrementally rotating said bobbin so that successive segments of the wiping media are presented to the tape in the cassette as a result of the incremental rotation of said bobbin when the cassette is moved.

2. The apparatus of claim 1 wherein said bobbin includes a ratchet wheel mounted thereto and said incremental rotating advancing means includes a drive pawl positioned into engagement with said ratchet wheel and a linkage assembly mounted upon said cradle for supporting said drive pawl for substantially linear movement and first biasing means for biasing said pawl against said ratchet wheel whereby linear movement of said drive pawl is transformed to incremental rotational movement of said bobbin, said pawl having a drive and a return stroke, said drive stroke being actuated by the physical movement of the cassette thereby incrementally rotating the bobbin in response thereto.

3. The apparatus of claim 2 wherein said linkage assembly defines a first pivotally supported arm secured to the wall of the cradle adjacent said bobbin, the pivotal axis of said arm being normal to and in fixed spatial relation to the rotational axis of said bobbin, a second biasing means urging said first arm about said pivot axis of said arm toward said bobbin and a second arm pivotally supported on the free end of said first arm carrying said drive pawl, said first biasing means biasing said second arm toward said ratchet wheel, whereby the return stroke of said pawl is provided by the biasing force of said second biasing means.

4. The apparatus of claim 3 which further includes braking means cooperating with said bobbin for preventing incremental movement on the return stroke of said drive pawl, said bobbin defining an outwardly disposed cavity, said braking means including a coil spring positioned within said bobbin cavity and biasing said bobbin toward said inner wall of said cradle.

5. In combination with a cassette recorder which utilizes a cassette containing a magnetic tape, wherein the cassette is selectively movable from a first position to a second position, an apparatus for wiping particles from the surface of the cassette tape during operation of the tape in said recorder, comprising:
- a wiping media defining a plurality of successive discrete wiping segments;
- a rotatable bobbin mounted upon said recorder for positioning a segment of said wiping media into contact with the magnetic tape when the cassette is positioned in said recorder, said wiping media being wrapped about an outwardly disposed surface of said bobbin for selective, surface contact with the tape; and
- means for incrementally rotating said bobbin in response to movement of the cassette from the first position to the second position, said incremental rotating means including a ratchet wheel coaxially mounted to said bobbin for rotation therewith; and further including
- a drive pawl positioned into engagement with said ratchet wheel, said pawl having a drive and a return stroke, said pawl drive stroke being activated by the physical movement of the cassette from the first position to the second position thereby incrementally rotating said bobbin in response to movement of the cassette.

6. The apparatus of claim 5 which further includes braking means cooperating with said bobbin for preventing incremental movement on the return stroke of said drive pawl.

7. The apparatus of claim 6 which further includes a linkage assembly supporting said drive pawl for substantially linear movement and first biasing means for biasing said pawl against said ratchet wheel whereby the linear movement of said drive pawl is transformed to incremental rotational movement of said bobbin.

8. The apparatus of claim 7 wherein said pawl linkage assembly defines a drive member for selective engagement with a portion of the tape cassette so that physical movement of said tape cassette imparts linear movement to said pawl through said drive member.

9. The apparatus of claim 8 wherein said linkage assembly defines a first pivotally supported arm, the pivotal axis of which is normal to and in fixed spatial relation to the rotational axis of said bobbin, a second biasing means urging said first arm about said pivot axis of said arm toward said bobbin and a second arm pivotally supported on the free end of said first arm carrying said drive pawl, said first biasing means biasing said second arm toward said ratchet wheel, whereby the return stroke of said pawl is provided by the biasing force of said second biasing means.

10. The apparatus of claim 9 wherein said bobbin defines an outwardly disposed inner cavity and wherein said braking means includes a coil spring positioned within said bobbin cavity and biasing said bobbin toward the support surface therefor.

11. The apparatus of claim 5 which further includes a linkage assembly supporting said drive pawl for substantially linear movement and first biasing means for biasing said pawl against said ratchet wheel whereby the linear movement of said pawl is transformed to incremental rotational movement of said bobbin.

12. The apparatus of claim 11 wherein said pawl linkage assembly defines a drive member for selective engagement with a portion of the tape cassette so that physical movement of said tape cassette imparts linear movement to said pawl through said drive member.

13. The apparatus of claim 12 wherein said linkage assembly defines a first pivotally supported arm, the pivotal axis of which is normal to and in fixed spatial relation to the rotational axis of said bobbin, a second biasing means urging said first arm about said pivot axis of said arm toward said bobbin and a second arm pivotally supported on the free end of said first arm carrying said drive pawl, said first biasing means biasing said second arm toward said ratchet wheel, whereby the return stroke of said pawl is provided by the biasing force of said second biasing means.

\* \* \* \* \*

UNITED STATES PATENT OFFICE
CERTIFICATE OF CORRECTION

PATENT NO. : 3,961,375

DATED : June 1, 1976

INVENTOR(S) : PAUL L. MIKA-KURT ROTHLISBERGER-RICHARD F. VEE

It is certified that error appears in the above–identified patent and that said Letters Patent are hereby corrected as shown below:

Column 7, claim 2, line 21, after "rotating" delete

--advancing--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*